(No Model.)

J. B. BUNTEN.
END GATE.

No. 365,967. Patented July 5, 1887.

WITNESSES:
George Binkenburg
C. Sedgwick

INVENTOR:
J. B. Bunten
BY Munn & Co
ATTORNEYS.

UNITED STATES PATENT OFFICE.

JOHN B. BUNTEN, OF BURK, IOWA.

END-GATE.

SPECIFICATION forming part of Letters Patent No. 365,967, dated July 5, 1887.

Application filed February 11, 1887. Serial No. 227,330. (No model.)

*To all whom it may concern:*

Be it known that I, JOHN BRAZELTON BUNTEN, of Burk, in the county of Benton and State of Iowa, have invented a new and Improved End-Gate, of which the following is a full, clear, and exact description.

My invention relates to wagon end-gates. Its objects are to provide lumber-wagons having a box-top thereon with an end-gate which may be set on a level with the wagon-bed and used as a platform or extension to said bed, be capable of adjustment to various angles with said bed for use as a scoop-board, and which may be locked and sustained in any of such positions.

Reference is to be had to the accompanying drawings, forming a part of this specification, in which similar letters of reference indicate corresponding parts in all the figures.

Figure 1:
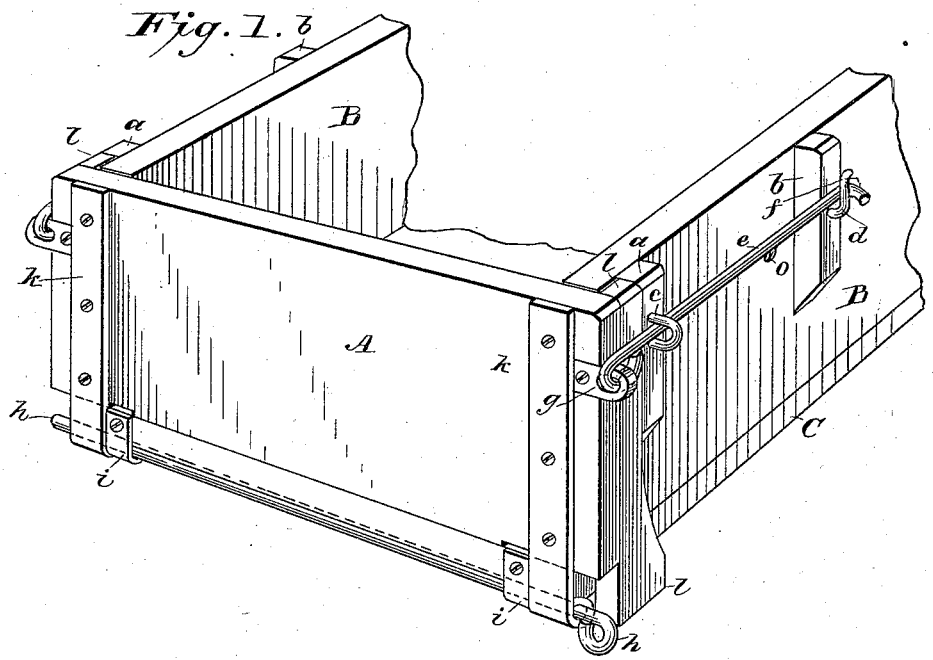
Figure 2:
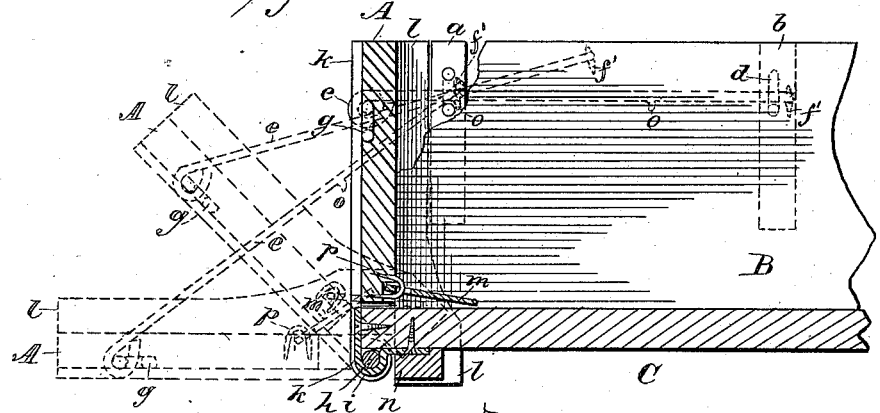
Figure 3:
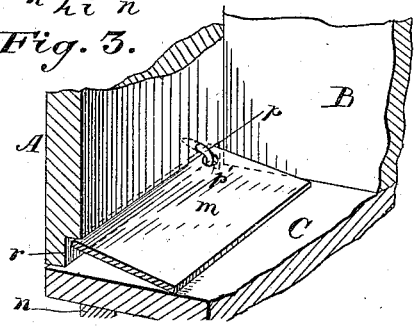

Figure 1 is a perspective view of part of a wagon-body, showing the gate locked and resting on the bed of the wagon and against the ends of its sides. Fig. 2 is a longitudinal vertical section of part of a wagon-body, showing the gate in position, as in Fig. 1, and also extending diagonally to and horizontal with the wagon-bed, the two latter positions being indicated by broken lines. Fig. 3 is a sectional view of part of a wagon-body, showing the gate in place on the bed of the wagon, with an apron attached to its inner lower edge.

The gate A has bolted to its outer face, near its ends, elongated hinge-clamps $k$, which turn upon a hinge-pin, $h$, sustained by clamps $i$, bolted to the end and under surface of the wagon-bed C. Its inner lower edge has a rabbet, $r$, formed in it corresponding in length to the interior width of the wagon-bed, to receive the edge of a metal apron, $m$, which is attached to said gate by staples or hinge-pins $p$, entering slots $p'$ in said apron. Along the outer edges of the inner surface of said gate are bolted side pieces, $l$, and to its outer surface, on either side of the hinges $k$ and near the upper edge of the gate, are secured outwardly-projecting eyes $g$. To said eyes $g$ are loosely attached rods $e$, constructed with burrs $o$ on their lower side, and having their free ends bent at a right angle to form hooks $f$, as shown in Fig. 1, or constructed with taps $f'$ on the upper and lower sides of said ends, to serve as hooks, as shown in Fig. 2.

To the sides B of the wagon body are bolted, near the end of said sides, supports $a$, each having inserted in it, near its upper end, an outwardly-projecting staple, $c$. Said sides also have bolted to them supports $b$, each of them having inserted in it, near its upper end, an outwardly-projecting catch, $d$. Said supports are parallel with each other, their tops are flush with the upper edge of said sides, and they are situated far enough apart to insure of the hook of the rods $e$ closely engaging with the catches $d$ when the gate is closed.

The rods $e$ pass from the eyes $g$ through the staples $c$, and their ends are hooked upon the catches $d$. When the gate is closed and locked, the side pieces, $l$, impinge against the supports $a$. A cleat, $n$, is bolted to the under surface of the wagon-bed, extends across the same between the bases of the side pieces, $l$, parallel with the hinge-rod $h$, and binds upon one end of the clamps $i$.

The gate A, being in the position shown in Fig. 1, is adjusted for use as a scoop-board by raising the hooked ends of the rods $e$ from the catches $d$ and allowing said rods to slide backward through the staples $c$ until the burrs $o$ stop against or the hooks $f$ engage with said staples, causing the gate to stand diagonally to or extend parallel with the bed of the wagon, as shown by the diagonal and horizontal dotted lines in Fig. 2.

In unloading a wagon having a scoop-board of the old-fashioned kind—that is to say, extending across the wagon upon the end-gate and sides or upon the sides—it is necessary to scoop out the load by commencing at its top and working downward, very nearly half of the load having to be scooped out before its discharge is well started, and the exertion of stooping and rising at every shovelful renders the operation extra laborious and tiresome.

With my invention one is enabled to reach the bottom of the load at once and to discharge the wagon with great ease and rapidity, the side pieces, $l$, preventing the spilling of the load at the sides of the board, and the apron $m$, which is drawn outward along the wagon-bed by the gate when it is set in position for scooping, prevents the load from dripping between the end of the wagon and said gate.

The adaptability of the gate for adjustment diagonally to or parallel with the wagon-bed facilitates the dumping of the contents of the wagon, the side pieces, *l*, and apron *m* performing the same office for the gate as when it is used as a scoop-board. It also enables the wagon to be used for the reception and discharge of hogs and other live stock.

When the gate is to be used as a dumping-board, it may either be dropped, as described, to the level of the wagon-bed (see Fig. 2) or the rods may be entirely released from the staples *c* and catches *d*, permitting the gate to swing outward and downward and hang at a right angle to the wagon-bed. In order to load and unload hogs or other live stock, said gate may be lowered to the level of the wagon-bed, as I have described, (see Fig. 2,) affording a level platform for the ingress and egress of the animals, be allowed to fall and afford an inclined way for the animals; or the wheels of the wagon may be sunk a little to allow the gate to rest upon the surface to which the animals are to be transferred. When used for this purpose, the side pieces, *l*, serve to prevent the animals from slipping off at the ends of the gate, and their feet are protected from entanglement between the gate and the wagon bed by the interposition of the apron *m*.

Having thus described my invention, what I claim as new, and desire to secure by Letters Patent, is—

1. In an end-gate for wagons, the combination, with the bed C, sides B, and gate A, having a rabbet, *r*, formed in its inner lower edge, of the apron *m*, loosely hinged to said gate in said rabbet and sliding on the bed of the wagon, substantially as and for the purpose herein shown and described.

2. In a wagon end-gate, the combination, with the bed C, sides B, and gate A, hinged to said bed, eyes *g*, projecting outward from the ends of said gate, and apron *m*, hinged to the inner lower edge of said gate, of the rods *e*, connected to said eyes, having burrs *o* on their lower sides and hooks *f* at their inner extremities, said hooks and burrs being adapted to engage with staples, as *c*, and catches, as *d*, on the sides of the wagon, as set forth.

3. In an end-gate for wagons, the combination, with the bed C, sides B, and gate A, hinged to said bed, eyes *g*, projecting outward from the ends of said gate, and apron *m*, hinged to the inner lower edge of said gate, of the rods *e*, connected to said eyes, having burrs *o* on their lower sides and taps *f'* on their inner extremities, said burrs and taps being adapted to engage with staples, as *c*, and catches, as *d*, on the sides of the wagon, as set forth.

4. An improvement in end-gates for wagons, consisting in providing the ends of the gate with outwardly-projecting eyes, carrying hook-rods constructed with burrs adapted to engage with catches and staples on the sides of the wagon, whereby said gate may be adjusted at any desired angle with the wagon-bed, as set forth.

JOHN B. BUNTEN.

Witnesses:
JOHN KNAPP,
A. A. WENTZ.